Figure 1:
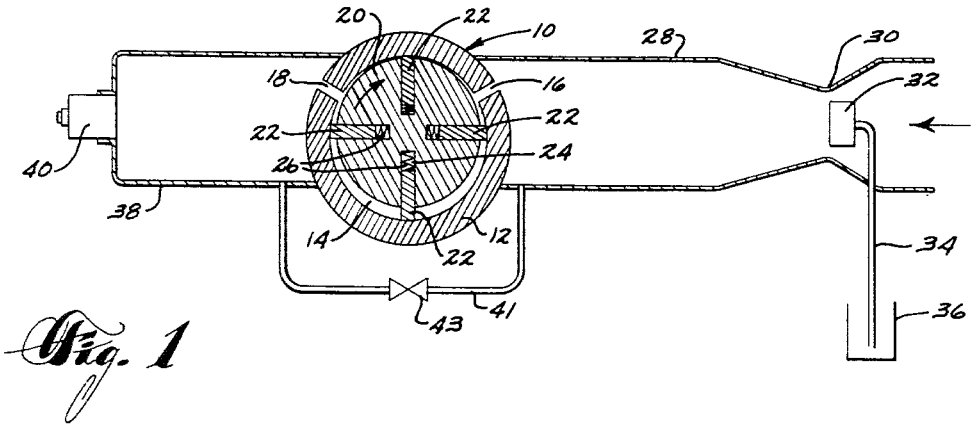

INVENTORS
ORVIS A. DAVIS, SR.
BY BRUCE R. WALSH

ATTORNEY

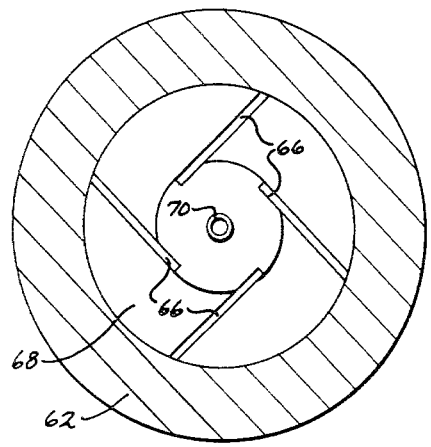
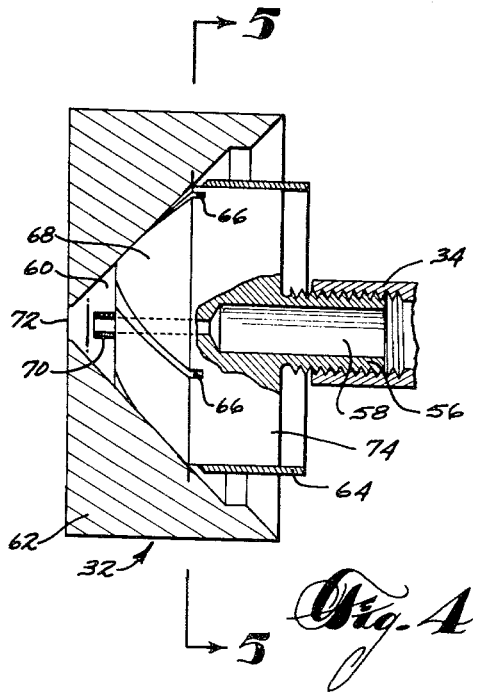
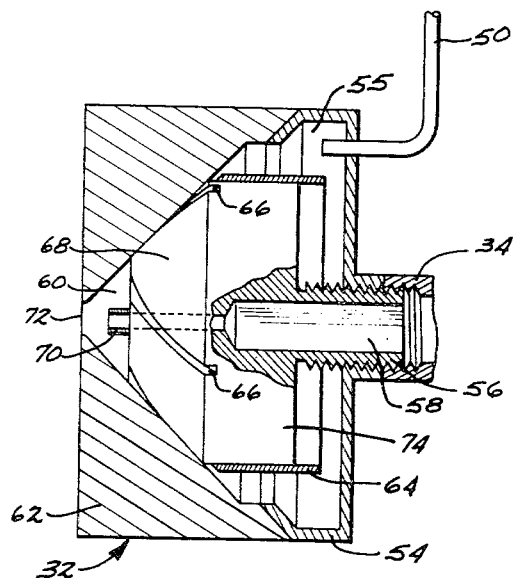

INVENTORS
ORVIS A. DAVIS, SR.
BRUCE R. WALSH
BY

ATTORNEY 3,232,536
PROCESS OF MIXING FLUIDS AND SPRAYING
Orvis A. Davis, Sr., Gibsonia, and Bruce R. Walsh, Wilkinsburg, Pa., assignors to Gulf Research & Development Company, Pittsburgh, Pa., a corporation of Delaware
Original application May 29, 1962, Ser. No. 198,498. Divided and this application Apr. 23, 1964, Ser. No. 362,000
7 Claims. (Cl. 239—8)

This invention relates to a process utilizing an aspirating nozzle. More particularly, this invention relates to a process utilizing a combination of nozzles, at least one of which is an aspirating nozzle, together with an air compressor for both preparing and spraying a compressed admixture of air and a liquid, such as fuel oil.

In terms of apparatus, this invention comprises an air compressor having an inlet or suction conduit and a discharge or pressure conduit. An aspirating nozzle is disposed in the inlet conduit. The aspirating nozzle is provided with air passageway opening means which is open to the inlet conduit. During operation of the air compressor at least a portion of the air stream in the inlet conduit enters the aspirating nozzle through said air passageway opening means and said nozzle is adapted so that the air passing therethrough aspirates a non-pressurized liquid such as fuel oil from an external source and sprays said fuel into the inlet conduit to produce a mixture of air and atomized fuel in said conduit. The air passageway opening means in the aspirating nozzle is provided with means for adjusting the size thereof and such adjustment regulates the quantity of fuel aspirated.

The mixture of air and atomized fuel prepared in the suction conduit is passed through the compressor where thorough admixing of air and fuel occurs. The fuel oil within the mixture advantageously serves to lubricate the compressor. In this manner the fuel oil serves a preliminary lubricating function by satisfying the complete lubrication requirements of the air compressor prior to its combustion as a fuel.

The pressurized air-fuel mixture discharged from the compressor is passed into the discharge conduit. A discharge or burner nozzle is connected to the discharge conduit and is adapted to spray the pressurized mixture of air and fuel contained therein. The discharge nozzle is adapted not only to spray the mixture but also to further admix the oil and air and to thoroughly atomize the oil by subjecting it to a thorough swirling motion. In this manner, the oil is sprayed as finally atomized oil droplets thoroughly admixed with air and ideally suited for combustion.

Each element in the apparatus of this invention performs a distinctive function not performed by any other element in the combination but which is interdependent with respect to the other elements. The aspirating nozzle in the compressor suction line advantageously utilizes a portion of the air which is subsequently employed for combustion to aspirate the total fuel requirements for the burner nozzle. Therefore, although the fuel is ultimately sprayed under pressure, no fuel pump is required. Furthermore, the aspirating nozzle is provided with means for adjusting the portion of the total air stream utilized for aspiration which in turn regulates the quantity of fuel aspirated. At a given air adjustment setting the portion of the total air stream utilized for aspiration is fixed. Since the rate of fuel aspiration is generally proportional to air flow rate, at a given air adjustment setting the rate of air flow to the compressor establishes the rate of fuel aspiration and fuel aspiration terminates upon cessation of compressor operation. Since there is no fuel pump, this control effect is accomplished without any control apparatus.

The aspirating nozzle, by virtue of its disposition in the suction line of the compressor, supplies the lubrication requirements of the compressor. Therefore, the fuel aspirated at the aspirating nozzle serves to lubricate the compressor while passing therethrough and prior to its combustion. In turn, the air compressor cooperates with the aspirating nozzle by drawing inwardly the air required to accomplish aspiration and thereby the total requirement of pressurized fuel for the discharge spray nozzle is satisfied without the necessity of a fuel pump.

The burner nozzle receives a pressurized mixture of oil and air from the air compressor. Its total fuel requirements are supplied by aspiration through the aspirating nozzle. The burner nozzle is of the swirling type and atomizes and further admixes the oil with the air to produce an advantageous spray mixture for combustion.

There is a particularly important advantage in the combination of an aspirating nozzle and an air compressor in accordance with this invention. This advantage evidently arises by virtue of the fact that an oil aspirating nozzle produces a fog-like spray containing oil droplets of an unusually small size. By being admitted to the compressor in the form of very small droplets, the oil is rendered capable of performing an especially effective sealing function at internal clearances within the compressor. In positive displacement devices used for compressing a gas, such as air, it is necessary that internal clearances between moving parts and the housing be of a capillary nature so that a minimum of internal leakage occurs between the discharge and inlet ends whereby a high volumetric efficiency can be obtained. With extended compressor use, wear between moving members and the housing tends to increase clearances and reduce volumetric efficiency.

It has been discovered that when oil is introduced into the inlet line of a positive displacement air compressor by means of an aspirating nozzle, the resulting superior seal in the compressor clearances increases volumetric efficiency. The following table shows data obtained from three tests utlizing the same air compressor. In the first test, no lubricant was employed. In the second test, drops of oil were allowed to fall by gravity into the inlet line of the air compressor. In the third test, oil was introduced into the inlet line of the air compressor through an aspirating nozzle.

| | Air flow rate through compressor, cubic feet per minute | Oil rate, gallon per hour | Compressor discharge pressure, p.s.i.g. |
|---|---|---|---|
| Test 1—No oil introduced | 0.6 | | 0.6 |
| Test 2—Oil drops introduced by gravity flow | 0.6 | 0.25 | 2.5 |
| Test 3—Oil introduced through an aspirating nozzle | 0.6 | 0.25 | 3.0 |

It is seen from the above data that the superior compressor sealing achieved by utilizing an aspirating nozzle resulted in a higher compressor discharge pressure.

In terms of process, the present invention comprises drawing a stream of atmospheric air by suction into a compressor, diverting at least a portion of said air stream to aspirate fuel oil existing under substantially atmospheric pressure into said air stream so that a mixture comprising atomized fuel oil and air is admitted to said compressor, compressing said mixture with said compressor, discharging said mixture of air and fuel oil under a superatmospheric pressure from said compressor and spraying said mixture.

In a modified embodiment the process of this invention comprises drawing by suction a first stream comprising atmospheric air into a compressor, diverting a portion of said first stream to aspirate fuel oil existing under substantially atmospheric pressure into said first stream to form a first mixture comprising air and fuel oil, adjusting the size of said portion of said first stream whereby the composition of said first mixture is adjusted, admitting said first mixture to said compressor, compressing said first mixture with said compressor, discharging from said compressor a second stream comprising said first mixture of air and fuel oil under superatmospheric pressure, the movement of said second stream aspirating into itself additional fuel oil existing under substantially atmospheric pressure to form a second mixture richer in fuel oil than said first mixture, and spraying said second mixture.

In still another embodiment, the process of this invention comprises drawing a suction stream containing atmospheric air into a compressor, compressing said suction stream with said compressor, removing from said compressor a discharge stream containing pressurized air, diverting a portion of said discharge stream to aspirate fuel oil existing under substantially atmospheric pressure into said suction stream so that both said suction stream and said discharge stream contain fuel oil in addition to air, and spraying the remainder of said discharge stream.

Figure 2:
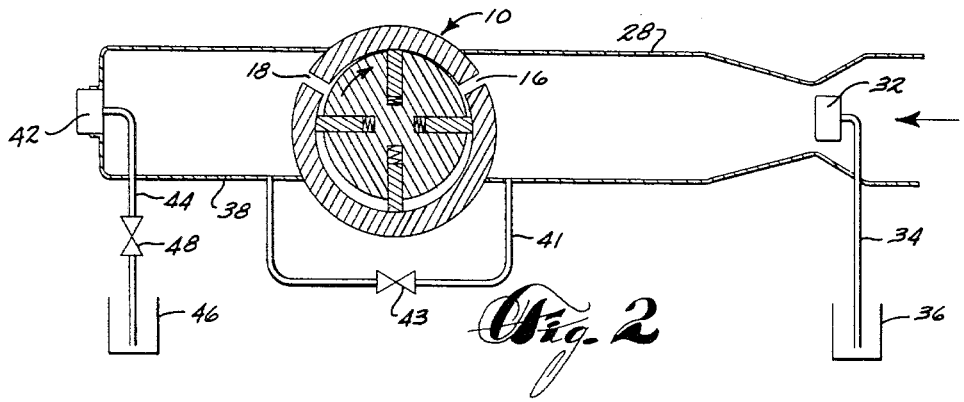
Figure 3:
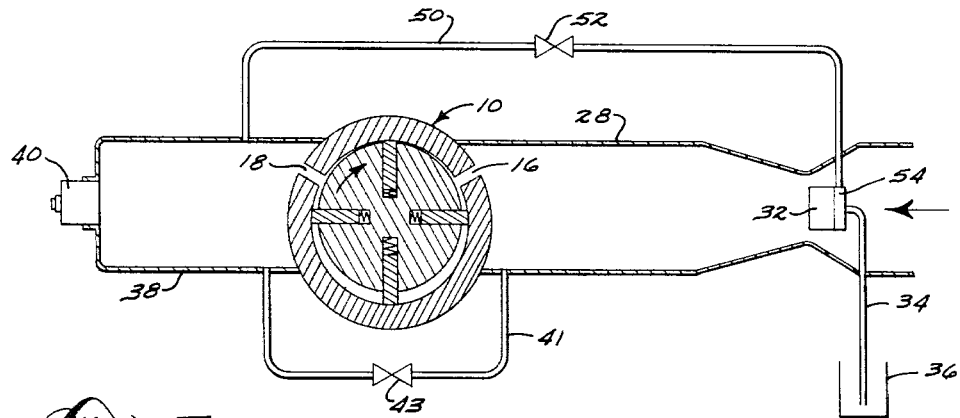

The invention will be more fully understood by reference to the attached drawings in which:

FIGURE 1 shows the basic aspirating nozzle, air compressor, atomizing nozzle combination of the invention, FIGURE 2 shows the combination of FIGURE 1 modified by replacement of the discharge atomizing nozzle with an aspirating nozzle, FIGURE 3 shows a modification of the combination of FIGURE 1 wherein a recycle conduit is provided from the compressor discharge to the aspirating nozzle, FIGURES 4 and 5 show details of an aspirating nozzle adapted for use in the apparatus of FIGURES 1 and 2, FIGURES 6 and 7 show details of an atomizing discharge nozzle adapted for use in the apparatus of FIGURES 1 and 3, and FIGURE 8 shows details of an aspirating nozzle adapted for use in the apparatus of FIGURE 3.

Referring to FIGURE 1, rotary positive displacement compressor 10 has a casing 12 having an interior cylindrical bore 14. Extending through casing 12 is inlet passageway 16 and outlet passageway 18. Mounted within bore 14 is a cylindrical rotor 20 which is attached to a rotary driving means, not shown. Rotor 20 and bore 14 are eccentric with respect to each other. A plurality of plungers 22 are disposed within respective complementary slots 24 in the body of rotor 20. Each plunger 22 is separated from the base of its respective slot 24 by means of a spring 26. Each spring 26 is in compression and continuously urges the plunger with which it is associated in sealing, fluid tight engagement against the surface of bore 14. Rotation of rotor 20 causes continuous change in the extent of protrusion of each plunger 22 from the outer periphery of rotor 20 so that the outer end of each plunger 22 is always in sealing engagement with respect to the wall of bore 14. Rotation of rotor 20, having a different center from bore 14, causes positive displacement of fluid entering through passageway 16 and discharge through passageway 18.

A suction or inlet conduit 28, preferably having a venturi restriction 30, is connected to pump inlet opening 16. An aspirating nozzle 32 is disposed axially within suction conduit 28 at the venturi restriction thereof and directed to spray toward the compressor. Tube 34 extends from aspirating nozzle 32 to an external liquid oil supply reservoir 36 disposed at a level no higher than that of aspirating nozzle 32, and preferably at a level substantially the same as or a few inches below that of aspirating nozzle 32. Reservoir 36 is under atmospheric pressure.

A discharge conduit 38 is connected to compressor discharge passageway 18 for transmitting pressurized fluid from compressor 10. At the terminus of discharge conduit 38 is a swirl-type, pressure spray nozzle 40. A bypass line 41 having a throttle valve 43 connects the discharge conduit 38 with inlet conduit 28. In the event that compressor 10 is of excess capacity, throttle valve 43 is opened.

The embodiment of FIGURE 2 is similar to that of FIGURE 1 except that discharge spray nozzle 40 is replaced by an aspirating nozzle 42. Aspirating nozzle 42 is similar to aspirating nozzle 32. A tube 44 extends from an external liquid oil reservoir 46 to aspirating nozzle 42. Reservoir 46 is on a level the same as or only a few inches below the lever of aspirating nozzle 42. In the event that aspirating nozzle 32 of FIGURE 2 does not supply the entire fuel requirements, valve 48 in tube 44 is opened so that additional fuel can be aspirated for spraying through nozzle 42.

The embodiment of FIGURE 3 is a similar to that of FIGURE 1 but is specially adapted for use with a compressor having excess capacity. A compressor bypass or recycle tube 50 equipped with a throttle valve 52 extends from discharge conduit 38 back to the aspirating nozzle 32. Nozzle 32 is equipped with a sealing cap or enclosure 54 to which a portion of the pressurized compressor discharge stream is supplied through tube 50. In this embodiment, the bypass stream from the compressor discharge provides substantially the entire aspirational effect at nozzle 32. The use of a pressurized aspirating fluid permits increased fuel aspiration.

FIGURES 4 and 5 show internal details of aspirating nozzle 32. Aspirating nozzle 32 is attached to fuel tube 34 by means of a threaded stud 56. Stud 56 is provided with an axial bore 58 through which fuel is passed to swirl chamber 60. A portion of the continuous stream of air drawn inwardly by compressor 10 through suction conduit 28 is entrapped in the zone between the outside rim of nozzle casing 62 and the exterior of sleeve 64 from which zone the air enters swirl chamber 60 through a plurality of slots 66 on the frusto-conical surface 68 of a swirl stem. Slots 66 enter the rear of swirl chamber 60 substantially tangentially as is clearly shown in FIGURE 5. The frusto-conical swirl stem surface 68 containing the slots 66 abuts in sealing engagement against a complementary interior surface of casing 62. Air entering swirl chamber 60, after passing through tangential slots 66, has a swirling motion imparted to it causing it to swirl in the swirl chamber and to establish an axial vortex which is under a vacuum. The fuel is exposed to this axial vortex causing it to be drawn through cylindrical tube 70 into the swirl chamber. A swirling mixture of air and fuel is discharged outwardly into suction conduit 28 in the direction of compressor 10 through swirl chamber discharge orifice 72.

Swirl chamber 60 is shown as having a conical shape. However, the swirl chamber can be of any shape having a circular cross section transverse to its longitudinal axis whereby an aspirating fluid is permitted to swirl. For example, a cylindrical swirl chamber can be employed.

Axial tube 70 whose outer periphery is cylindrical in shape extends into swirl chamber 60 to an intermediate axial position therein which position is further from the rear of the swirl chamber than the distance of any air inlet openings from the rear of the swirl chamber. Cylindrical tube 70 is important to the operation of the aspirating nozzle and the nozzle would not operate effectively in its absence. The reason cylindrical tube 70 is important to the operation of the aspirator is that the oil being aspirated should be exposed to the swirl chamber in a region in which the swirling gas has assumed a definite longitudinal movement. Swirling air has a central vortex which is under a vacuum into which aspiration of fuel can proceed. When the air enters the base of the swirl chamber through tangential slots 66 its pattern of movement is substantially spiral and, in the absence of a cylindrical tube 70, this spiral air movement would cause the air to traverse and thereby obstruct the fuel opening to the swirl chamber. For example, it was found that if the cylindrical tube 70 is omitted so that the axial fuel inlet port and the tangential slots 66 are both flush with the base of conical swirl chamber 60, substantially no fuel aspiration occurs. Utilization of an axial oil inlet tube 70 extending to an intermediate position along the length of the swirl chamber permits a swirling pattern of longitudinal air movement to develop prior to exposure of fuel to the air stream. A highly important aspect of an operable aspirating nozzle is that the fluid being aspirated must be axially exposed to the swirl chamber at an intermediate position therein. In this manner effective aspiration of fuel into the vortex of a swirling stream of air is accomplished and no external pressure need be applied to the fuel entering the system.

The air passing through the aspirating nozzle enters the swirl chamber near the base of axial duct 70 and swirls around the duct. The duct is sufficiently long to permit the air to assume a definite longitudinal pattern of movement prior to reaching the open end thereof. In this manner, the swirling gas travels past the opening at the end of duct 70 in a parallel direction and never travels transversely across the opening. Parallel movement past the opening allows aspiration of fuel into the vortex of the swirling air to proceed, whereas any transverse component of air movement across the opening would tend to block the opening and inhibit aspiration.

The diameter of discharge orifice 72 must be larger than the internal diameter of oil duct 70. A column of oil is drawn into swirl chamber 60 from oil duct 70 and discharged through orifice 72. Aspirating air, in addition to this oil, must be discharged through orifice 72. Therefore, the diameter of orifice 72 must be sufficiently larger than the internal diameter of oil duct 70 to accommodate discharge of the air in addition to the oil without creation of a back pressure against oil duct 70.

It was further found by tests that the exterior surface of axial inlet duct 70 should be cylindrical, i.e., it should extend longitudinally parallel to the nozzle axis. It was found that if the exterior of the axial inlet duct defines a frustum of a cone, with its broad base coincident with the rear of the swirl chamber and its smaller base closest to the swirl chamber orifice, it is difficult to aspirate sufficient fuel to discharge a combustible mixture from the nozzle. It was also found that if the exterior of the axial inlet duct is hemispherical in shape with the base of the hemisphere coincident with the rear wall of the swirl chamber it is difficult to aspirate sufficient fuel to discharge a combustible mixture from the nozzle. In contrast, when an axial duct whose exterior surface had a cylindrical shape was employed highly satisfactory aspiration was achieved. The reason is that in the cases of the frusto-conical and hemispherical axial ducts the swirling air was directed past the fuel opening in a direction at least partially transverse thereto, thereby tending to inhibit aspiration. On the other hand, with a cylindrical axial duct the air traveling past the opening moves completely parallel to the opening thereby preventing back pressure against the opening and allowing aspiration to proceed. With an axial duct whose outer periphery is cylindrical in shape the only axial component of movement of the swirling air stream in the region surrounding the opening of the axial duct is parallel to the opening, rather than transverse to it.

The quantity of fuel aspirated is advantageously adjustable in accordance with this invention. The quantity of fuel aspirated can be adjusted solely by regulating the amount of air permitted to enter into aspirating nozzle 32 and the fuel supply system itself can be free of throttling means, thereby avoiding plugging thereof. Adjustment of the air supply to aspirating nozzle 32 is accomplished by axial adjustment of sleeve 64 which fits snugly around the base portion 74 of the swirl stem, thereby permitting at least partial obstruction of the entrance to air slots 66. Axial adjustment of sleeve 64 to establish a fixed opening to air slots 66 establishes the ratio of fuel aspirated to air flow. At a constant air flow rate to the compressor, the ratio of fuel to air can be changed by adjustment of sleeve 64 to a different axial position.

A particular advantage of the aspirator-compressor combination of this invention is that the quantity of fuel can be adjusted by indirect means rather than by direct means. By adjustment of the size of the entrance to air slots 66 in the aspirator the proportion of the total air flow through the compressor which is utilized for aspirational purposes is either increased or decreased. An increase or decrease of the proportion of total air flow directed through the aspirator proportionally changes the rate of oil flow. In this manner, adjustment of oil flow is accomplished without altering the total air flow rate through the compressor and without throttling of an oil conduit. Regulation of the quantity of oil drawn into a compressor in this manner without throttling the size of the oil conduit is advantageous since regulation of oil flow by the alternate method of throttling the oil conduit causes frequent plugging of the conduit due to unavoidable particles of dirt lodging therein.

A mixture of air and fuel is sprayed from discharge orifice 72 of aspirating nozzle 32 and this spray mixes with the remainder of the air drawn by compressor 10 which moves past nozzle 32 along the exterior thereof. The resulting air-fuel mixture enters compressor 10 through inlet passageway 16 wherein it is entrapped between adjacent plungers 22 and compressed by clockwise rotation of cylinder 20 which forces the mixture through passageway 18 into discharge conduit 38. In the embodiments shown in FIGURE 1 and FIGURE 3, the compressed air-oil mixture in discharge conduit 38 passes into discharge nozzle 40. In the embodiment of FIGURE 2, the compressed air-oil mixture in discharge conduit 38 passes into aspirating nozzle 42, which is similar to aspirating nozzle 32.

Figure 6:
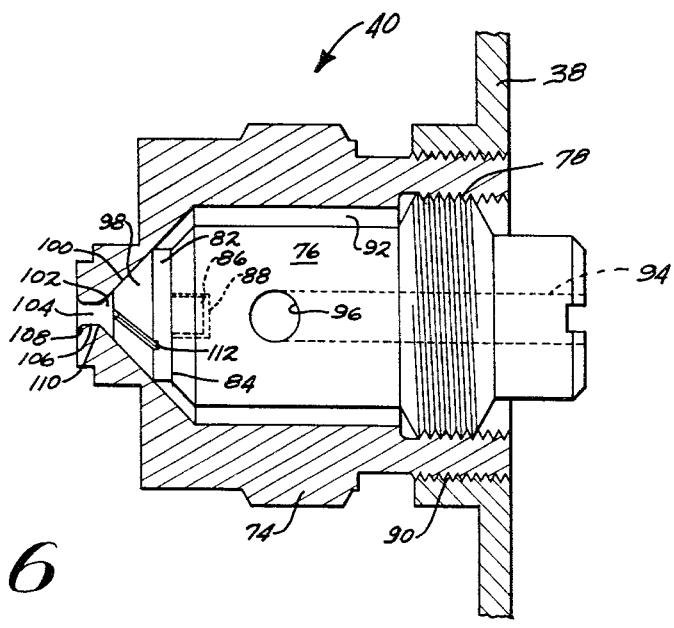
Figure 7:
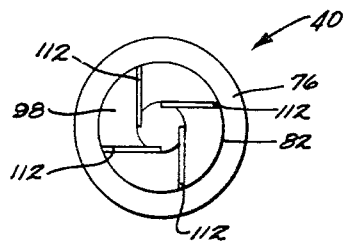

The details of discharge nozzle 40 are illustrated in FIGURES 6 and 7. Referring to FIGURES 6 and 7, a swirl stem 82 is disposed within a hollow nozzle body 74. Swirl stem 82 is urged into position by means of insert element 76 which is in engagement with nozzle body 74 at threads 78. Insert element 76 and swirl stem 82 have flat surfaces indicated at 84 that are in sliding engagement so that each can be rotated and shifted radially relative to the other. A cylindrical central stud 86 on the swirl stem 82 is received in a central cylindrical opening 88 in the insert element 76. The opening 88 is sufficiently larger than the stud 86 to permit adequate radial movement of swirl stem 82.

Nozzle body 74 is externally threaded at 90 for connection to the wall of discharge conduit 38. Insert element 76 is spaced from the nozzle body 74 to define an annular space 92 which has access to conduit 38 through a central bore 94 and an intersecting transverse opening 96.

Swirl stem 82 includes a frusto-conical portion 98 that meets a complementary frusto-conical internal surface 100 of the nozzle body 74. A swirl chamber 102 is defined between the end of frusto-conical portion 98 of the swirl stem and the nozzle body 74, and a discharge orifice 104 is provided in the nozzle body 74 communicating with the swirl chamber 102. The discharge orifice 104 includes an intermediate cylindrical axial section 106, with the discharge orifice 104 being outwardly flared at 108. Discharge orifice 104 is also flared, at 110, from the cylindrical section 106 toward its inlet end at the swirl chamber 102.

The frusto-conical portion 98 of the swirl stem is provided with a plurality of circumferentially spaced swirl slots 112 extending along the length thereof. Slots 112 are arranged substantially tangentially with respect to the swirl chamber 102. The slots 112 can be straight, as shown in FIGURE 7, or generally helical in configuration. The purpose of the slots 112 is to provide fluid communication between the space 92 and the swirl chamber 102 of restricted cross sectional area and arrangement so that the mixture of air and oil will flow at high velocity into swirl chamber 102 and rotate or swirl about the central axis of the swirl chamber 102.

Compressor 10 forces oil and air under pressure through conduit 38 whence it enters nozzle 40. In entering nozzle 40 the mixture passes through bore 94, transverse opening 96, annular space 92 and slots 112. Slots 112 cause the mixture of oil and air to swirl in swirl chamber 102 so that it is sprayed from the nozzle through discharge orifice 104. The swirling motion causes the oil in said spray to be thoroughly atomized.

FIGURE 8 shows the detail of nozzle 32 modified for use in the embodiment of FIGURE 3 by the addition of cap 54 in threaded engagement with stud 56 and in sealing engagement against nozzle body 62 to establish pressure zone 55. In the aspirating nozzle of FIGURE 8, pressurized fluid is supplied to pressure zone 55 from the discharge conduit 38 of compressor 10 through tube 50 and valve 52 and this pressurized fluid accomplishes the aspiration of oil in reservoir 36, which is open to the atmosphere. The use of aspirating fluid which is under pressure accomplishes aspiration of an increased quantity of oil. The ratio of air to oil is regulated by axial movement of sleeve 64 in nozzle 32.

Various changes and modifications can be made without departing from the spirit of this invention or the scope thereof as defined in the following claims.

This application is a division of Serial Number 198,498, filed May 29, 1962, now Patent No. 3,175,643.

We claim:

1. A process comprising drawing a stream of atmospheric air into a positive displacement compressor, diverting a portion of said air stream to aspirate oil existing under substantially atmospheric pressure, swirl-atomizing the aspirated oil so that a mixture comprising atomized, aspirated oil and air is admitted to said compressor, discharging from said compressor a mixture of air and oil under a superatmospheric pressure, and spraying said pressurized mixture.

2. A process comprising drawing a first stream comprising atmospheric air into a positive displacement compressor, diverting a portion of said first stream to aspirate fuel oil existing under substantially atmospheric pressure, swirl-atomizing the aspirated fuel oil into said first stream to form a first mixture comprising atomized, aspirated fuel oil in air, adjusting the size of said portion of said first stream whereby the atomized, aspirated fuel content in said first mixture is adjusted, admitting said first mixture to said compressor, compressing said first mixture with said compressor, discharging from said compressor a second stream comprising said first mixture of air and fuel oil under superatmospheric pressure, the movement of said second stream aspirating into itself additional fuel oil existing under substantially atmospheric pressure to form a second mixture richer in fuel oil than said first mixture, and spraying said second mixture.

3. A process comprising drawing an inlet stream containing atmospheric air into a positive displacement compressor, compressing said inlet stream with said compressor, removing from said compressor a discharge stream containing pressurized air, diverting a portion of said discharge stream to aspirate fuel oil existing under substantially atmospheric pressure, swirl-atomizing said aspirated fuel oil into said inlet stream, and spraying the remainder of said discharge stream.

4. A process comprising drawing a stream of gas into a positive displacement compressor, diverting a portion of said gas stream into an aspirating nozzle swirl chamber so that said gas stream swirls within said swirl chamber, exposing liquid under substantially atmospheric pressure to said swirl chamber, the swirling motion of said gas stream portion aspirating said liquid and swirl-atomizing the aspirated liquid so that a mixture comprising atomized, aspirated liquid and gas is admitted to said compressor, discharging from said compressor a pressurized mixture of gas and liquid, and spraying said pressurized mixture.

5. A process comprising drawing a first stream comprising atmospheric air into a positive displacement compressor, diverting a portion of said first stream to aspirate fuel oil existing under substantially atmospheric pressure, swirl-atomizing the aspirated fuel oil into said first stream to form a first mixture comprising atomized, aspirated fuel oil in air, admitting said first mixture to said compressor, compressing said first mixture with said compressor, discharging from said compressor a second stream comprising said first mixture of air and fuel oil under super-atmospheric pressure, the movement of said second stream aspirating into itself additional fuel oil to form a second mixture richer in fuel oil than said first mixture, and spraying said second mixture.

6. A process comprising drawing a first stream comprising atmospheric air into a positive displacement compressor, diverting a portion of said first stream to aspirate oil exisiting under substantially atmospheric pressure, swirl-atomizing the aspirated fuel oil into said first stream to form a mixture comprising atomized, aspirated fuel oil in air, admitting said mixture to said compressor, compressing said mixture with said compressor, discharging from said compressor a second stream comprising said mixture of air and oil under superatmospheric pressure, and sparying said second stream.

7. A process comprising drawing a first stream comrising atmospheric air into a positive displacement compressor, diverting a portion of said first stream to aspirate oil existing under substantially atmospheric pressure, swirl-atomizing the aspirated fuel oil into said first stream to form a mixture comprising atomized, aspirated fuel oil in air, admitting said mixture to said compressor, compressing said mixture with said compressor, discharging from said compressor a second stream comprising said mixture of air and oil under super-atmospheric pressure, diverting a portion of said second stream to aspirate additional oil, atomizing the additional fuel oil into said second stream to form a second mixture, and spraying said second mitxure.

References Cited by the Examiner

UNITED STATES PATENTS

| | | | |
|---|---|---|---|
| 1,403,140 | 1/1922 | Wiggins | 239—331 |
| 1,561,039 | 11/1925 | Walker | 239—317 |
| 1,644,029 | 10/1927 | Porsche. | |
| 1,686,413 | 10/1927 | Laronde | 261—24 |
| 2,239,305 | 4/1941 | Tacconi. | |
| 2,419,679 | 4/1947 | Embshoff | 261—24 |
| 2,705,171 | 3/1955 | Ziherl | 239—399 |
| 2,714,503 | 8/1955 | Heisler | 261—79 |
| 3,119,562 | 1/1964 | Tyler | 239—318 |

FOREIGN PATENTS 957,200   8/1949   France.

M. HENSON WOOD, Jr., *Primary Examiner.*

EVERETT W. KIRBY, *Examiner.*